(12) United States Patent
Duback

(10) Patent No.: US 6,167,650 B1
(45) Date of Patent: Jan. 2, 2001

(54) COATED FLY FISHING LINE AND A METHOD AND APPARATUS FOR COATING A FLY FISHING LINE

(75) Inventor: Earl Duback, Ledyard, CT (US)

(73) Assignee: The Orvis Company, Inc., Manchester, VT (US)

(*) Notice: Under 35 U.S.C. 154(b), the term of this patent shall be extended for 0 days.

(21) Appl. No.: 09/160,263

(22) Filed: Sep. 25, 1998

(51) Int. Cl.$^7$ ................................................. A01K 91/12
(52) U.S. Cl. .................................................... 43/44.98
(58) Field of Search ........................ 43/44.98; 428/364, 428/368, 375

(56) References Cited

U.S. PATENT DOCUMENTS

| | | | |
|---|---|---|---|
| 2,862,282 | * | 12/1958 | Beebe .................................. 43/44.98 |
| 3,043,045 | * | 7/1962 | Martuch ............................... 43/44.98 |
| 3,486,266 | * | 12/1969 | Richardson et al. ................. 43/44.98 |
| 3,512,294 | * | 5/1970 | Howald ................................ 43/44.98 |
| 3,523,034 | * | 8/1970 | Howald ................................ 43/44.98 |
| 3,748,168 | * | 7/1973 | Schmidt et al. ..................... 43/44.98 |
| 3,820,271 | * | 6/1974 | Martuch et al. ..................... 43/44.98 |
| 3,830,009 | * | 8/1974 | Collingbourne ..................... 43/44.98 |
| 3,849,929 | * | 11/1974 | Martuch ............................... 43/44.98 |
| 3,868,785 | * | 3/1975 | Foote ................................... 43/44.98 |
| 3,936,335 | * | 2/1976 | Martuch ............................... 43/44.98 |
| 4,048,744 | * | 9/1977 | Chandler .............................. 43/44.98 |
| 4,330,956 | * | 5/1982 | McCarthy ............................ 43/44.98 |
| 4,353,960 | * | 10/1982 | Endo et al. ............................ 43/4.98 |
| 4,386,132 | * | 5/1983 | Dille et al. ............................ 43/44.98 |
| 4,606,144 | * | 8/1986 | Sasaki et al. ......................... 43/44.98 |
| 4,952,344 | * | 8/1990 | Burgess ................................ 264/40.1 |
| 5,207,732 | * | 5/1993 | Stark .................................... 43/44.98 |
| 5,240,774 | * | 8/1993 | Ogawa et al. ..................... 428/411.1 |
| 5,296,292 | * | 3/1994 | Butters ................................. 43/44.98 |
| 5,437,900 | * | 8/1995 | Kuzowski ............................ 43/44.98 |
| 5,538,762 | * | 7/1996 | Ogawa et al. ........................ 427/503 |
| 5,608,003 | * | 3/1997 | Zhu ....................................... 524/516 |
| 5,625,976 | * | 5/1997 | Goodale ............................... 43/44.98 |
| 5,679,399 | * | 10/1997 | Shlenker et al. ...................... 427/2.3 |
| 5,760,126 | * | 6/1998 | Engle et al. .......................... 524/516 |

FOREIGN PATENT DOCUMENTS

WO 92/03922 * 3/1992 (WO) .................................. 43/44.98

OTHER PUBLICATIONS

Copies of pp. 134–139 and the front cover of the 1996 Master Spring Catalog from Cabela's.

* cited by examiner

Primary Examiner—Darren W. Ark
(74) Attorney, Agent, or Firm—Vickers, Daniels & Young

(57) ABSTRACT

A fly fishing line having an acrylic resin bonded polytetrafluorethylene coating is described. A process for creating this coating including application of the coating and layers with removal of the carrier between layer application steps and a final cure step in which all layers are cured into a unitary structure is also described.

47 Claims, 2 Drawing Sheets

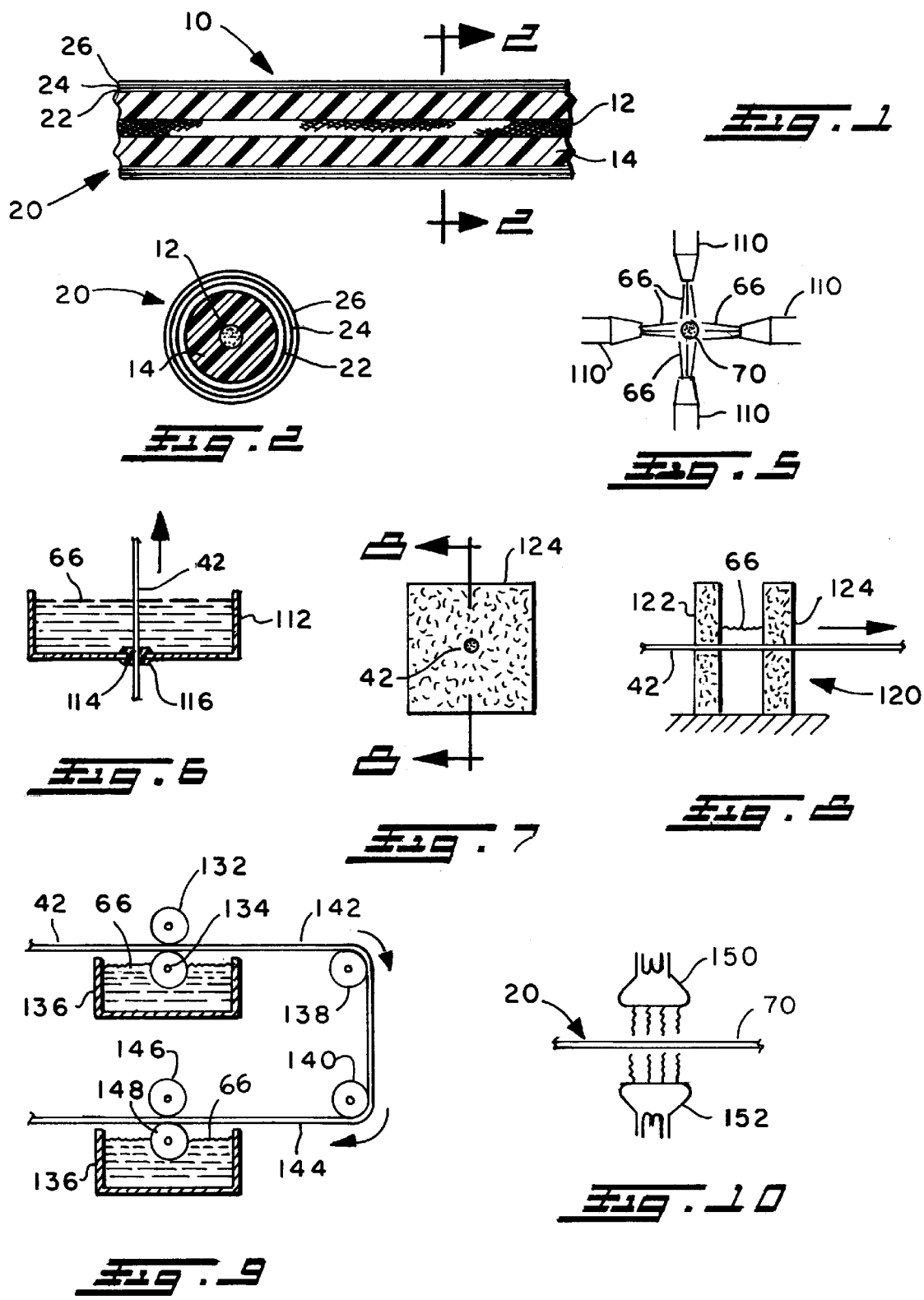

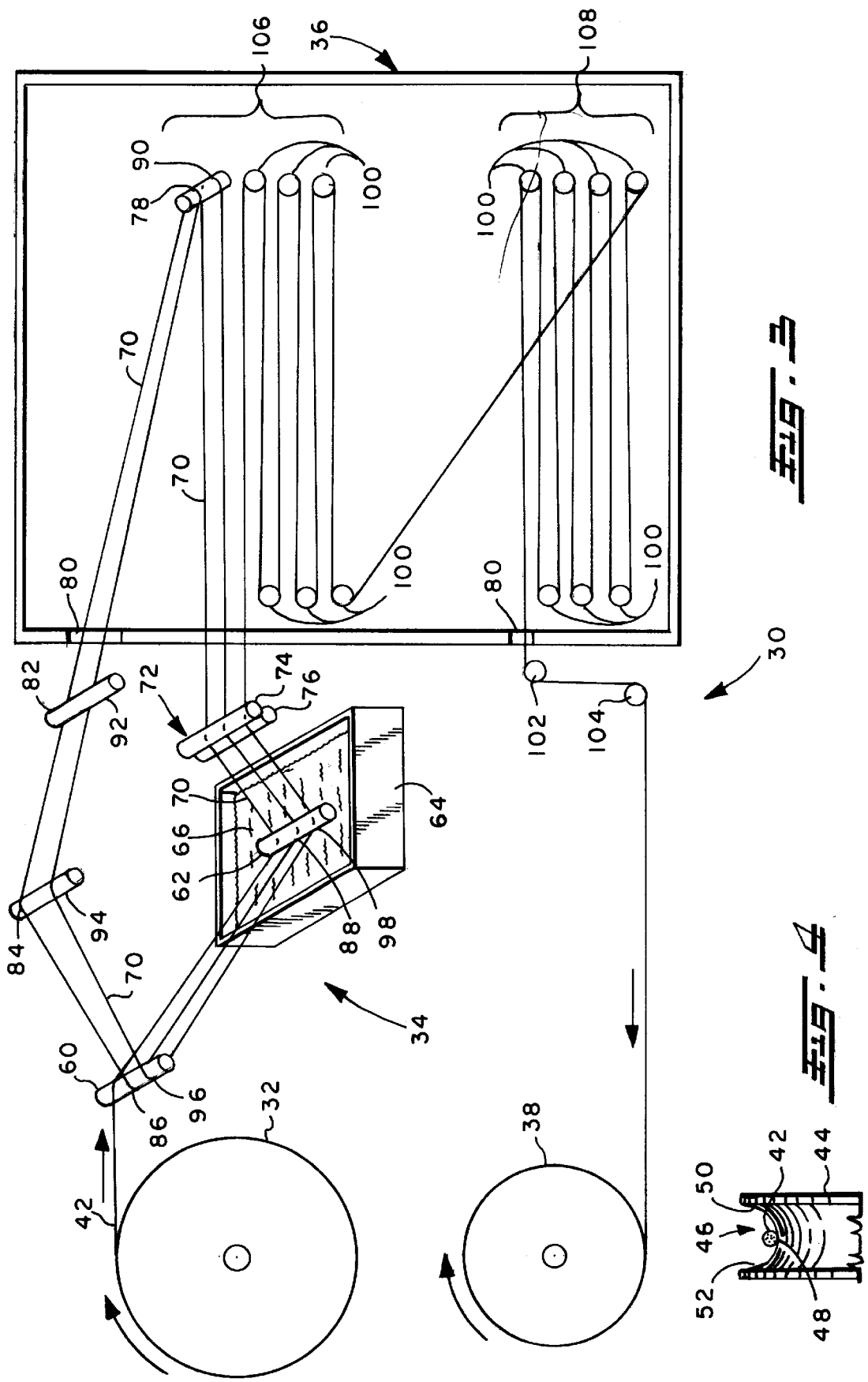

COATED FLY FISHING LINE AND A METHOD AND APPARATUS FOR COATING A FLY FISHING LINE

BACKGROUND OF THE INVENTION

This invention relates generally to fly fishing lines of the type having a flexible core and a body surrounding the core and more particularly to a coated fly fishing line and a method and apparatus for creating such lines.

Fly fishing lines have been available for many years. For at least the last 20 years, fly fishing lines comprising a core surrounded by a plastic body have been available. The cores often are braided material. The body is often polyvinyl chloride (PVC). Such fly lines are commercially available from a number of sources with various characteristics.

In fly fishing, one uses a resilient rod, a reel, a fly fishing line, a leader and a fly. Most of the fly fishing line is contained on the reel. The working end of the fly fishing line passes through guides on the rod end attached to the leader which is attached to the fly. The fly and leader are normally very light and do not have enough mass to be thrown or cast very far on their own. The fly fishing line supplies the mass necessary for casting. The line is cast and carries the leader end fly with it. One casting technique used to obtain long casts involves "shooting" line. Rapid movement is generated in the fly line in the back cast. Then, in the forecast, a body of line held near the reel is allowed to follow the line already beyond the rod tip. The length of line beyond the rod tip is thus increased and the line and fly "shoot" toward the target.

Fly fishing lines are available having various diameter and density profiles along their length, to allow for different types of casting and different actions of the fly after the fly lands on the water.

Prior art fly lines are not perfect. Prior art fly lines often pick up dirt, scum or debris from the water. This makes it more difficult to pass the line easily through the guides on a fly fishing rod. If the line is dirty, shooting does not work as intended and the cast is less optimal. A fly fishing line designed to float on top of the water will sometimes start to sink after picking up dirt in several casts.

Salt water fly fishing is growing in popularity. The above described problems appear to be even more severe in a tropical saltwater environment. It appears to many anglers that fly lines become sticky and dirty more quickly in the salt water environment. Shooting of line is more important in the salt water environment because high winds are often encountered. This requires one to backcast and forecast forcefully in order to shoot the intended length of line through the guides into the wind. If the line is sticky, shooting is impaired and casts are much shorter than intended.

This problem has been recognized and addressed in the past through the use of fly line dressing and fly line dressing kits. A pad for cleaning fly line and small bottles of coating material are sold in many fly fishing stores. One uses the pad to clean the line and apply fresh dressing. These are consumable items as it is anticipated that the coating will dissipate in a short while and/or the line will become dirty over the coating. This approach is far from optimal. Unless one is very conscientious, one only learns that one's fly line needs cleaning and dressing by missing a cast. The technique requires repeated cleaning and an application of a chemical to the fly line which interrupts and interferes with fishing. In order to clean and coat a fly line, one must strip an appreciable length of the line off the rod and reel and then reel it back in after or during the cleaning and coating operation. This often must be done with the rod assembled in an inconvenient location such as on a drift boat or while waiting in saltwater flats. Knots, tangles and damage to the line or leader is common.

SUMMARY OF THE INVENTION

The present invention provides an improved fly fishing line with a permanent coating which overcomes the above-referred problems and others and also a method for making this improved fly fishing line and the apparatus for executing this method.

In accordance with the present invention, a fly line comprising a core surrounded by a body is coated with a fluorocarbon containing material which is cured to the fly line creating a permanent outer coating.

Still further in accordance with the invention, a fly fishing line is provided having a coating consisting of a polytetrafluorethylene contained in an acrylic resin binder permanently cured onto the body of the fly line.

Yet further in accordance with the invention, a fly fishing line is provided having a polytetrafluorethylene containing coating which is built-up from multiple resin applications which are cured as a unit.

Yet further in accordance with the invention, a fly fishing line is provided having a permanent coating which resists soiling, improves the shooting characteristics of the fly line, reduces line tangling, and prevents the degradation of characteristics of the fly line by sunlight and saltwater.

Yet further in accordance with the invention, a method is provided for coating of fly fishing line comprising applying a controlled amount of a coating material containing a residue and a carrier to the fly fishing line, evaporating the carrier, applying a subsequent coating of coating material, evaporating the carrier, applying a third coating of the coating material, evaporating the carrier, and curing built-up coating material onto the fly line.

Still further in accordance with the present invention, the carrier is evaporated from the fly line by means of heating the fly line by passing it through an oven having a controlled temperature.

Yet further in accordance with the present invention, the resin coating is cured on the fly line by passing the coated fly line through an oven for periods longer than required for evaporating the carrier.

Still further in accordance with the present invention, an apparatus is provided having a coating applicator which applies a controlled amount of coating to a fly line, an oven including an evaporator station receiving the line from the applicator and evaporating the carrier in the coating and returning the fly line to the applicator at least once; and, a curing station in the oven in which all of the built-up layers of coating are cured by passing the line through the oven for a period in excess of what is required to evaporate the carrier.

It is the primary object of the present invention to provide a fly fishing line with a permanent coating providing superior shooting capabilities.

It is another object of the present invention to provide a fly fishing line which does not require periodic cleaning and coating with line dressings.

It is still another object of the present invention to provide a fly fishing line having a coating which protects the fly fishing line body from ultraviolet degradation.

It is yet another object of the present invention to provide a fly fishing line with a durable built-up coating providing improved shooting ability, dirt repulsion and uniformity of characteristics.

It is still another object of the present invention to provide a fly fishing line with a coating that will last all season and beyond.

It is yet another object of the present invention to provide a method for applying a coating to a fly line which applies a uniform thin coating of material which is cured to the body of the fly line without damaging the body of the fly line.

It is still another object of the present invention to provide an apparatus for applying a coating to a fly line which applies coating material in multiple controlled passes which can be cured as a unit to the fly line resulting in a uniform durable coating.

BRIEF DESCRIPTION OF THE DRAWINGS

These and other objects of the invention will become apparent from the following detailed discussion of a preferred embodiment and from the accompanying drawings wherein:

FIG. 1 is a longitudinal section of the fly line in accordance with the present invention emphasizing the built-up nature of the exterior coating;

FIG. 2 is a cross-sectional view of the fly line taken perpendicular to the longitudinal section along the line 2—2 of FIG. 1;

FIG. 3 is a schematic diagram of an apparatus for manufacturing the coated fly line seen in FIGS. 1 and 2;

FIG. 4 is a detailed view of a portion of one of the sheaves seen in FIG. 3;

FIG. 5 shows a spraying apparatus which can be used as an alternate means of applying coating to the fly line in the apparatus of FIG. 3;

FIG. 6 shows a vertical travel method of applying a coating to a fly line which can be used in the apparatus of FIG. 3;

FIG. 7 shows yet another mechanism for applying a coating material to a fly line usable in the apparatus of FIG. 3;

FIG. 8 is a cross section of the apparatus of FIG. 7 taken along line 8—8 in FIG. 7;

FIG. 9 shows yet another apparatus which can be used to apply coating material to the fly line in the apparatus of FIG. 3; and, FIG. 10 shows an alternate heating appliance for use in places the oven is seen in FIG. 3.

DESCRIPTION OF A PREFERRED EMBODIMENT

Referring now to the drawings wherein the showings are for the purposes of illustrating a preferred embodiment of the invention only and not for the purpose of limiting same, FIG. 1 shows a longitudinal section of a coated fly fishing line 10 in accordance with the invention. Conventional line comprises a core 12 and a body 14. The core 12 is often braided fibers. It is flexible and relatively strong. The body 14 is often polyvinyl chloride or other resinous material with various fillers. It is extruded onto the core 12 or coated onto the core by other means. The body 14 provides mass, stiffness and appropriate density for the particular fly line. The body 14 is varied from fly line to fly line to provide a range of sinking or floating characteristics. The body 14 also varies over the length of a fly line in various tapers as desired. These variations in the body 14 of the fly line are conventional and well known in the art.

Surrounding the body 14 in FIGS. 1 and 2 is a coating 20. The coating 20 is unitary structure but the coating 20 is a built-up coating consisting of an inner layer 22, an intermediate layer 24 and an outer layer 26. The coating 20 comprises polytetrafluorethylene in an acrylic resin bonding. The coating 20 is applied in three layers, the inner layer 22, the intermediate layer 24, and the outer layer 26 and cured into a unitary structure adhering to the body of the fly line. The coating is permanent and provides increased shootability to a fly line. The coating 20 also protects the body 14 of a fly line from ultraviolet degradation and many environmental contaminants, such as gasoline, which are often encountered in fishing environments. The coating prevents dirt accumulation on the line and also prevents the fly line from becoming tacky after long exposures to heat and sunlight in tropical fishing environments. The coating 20 is permanent.

The preferred coating material contains polytetrafluorethylene. This provides slickness, shootability and some UV protection for the line. The preferred resin which bonds the polytetrafluorethylene is an acrylic resin. The polytetrafluorethylene and acrylic resin remain on the line after processing and curing. A carrier, which aids in application is preferably water-based. An appropriate material is available from Acheson Colloids and is identified as Emralon 312.

FIG. 3 illustrates an apparatus and process for applying the coating 20 and creating the coated fly line 10. The coating apparatus 30 comprises a payout reel 32, an applicator 34, an evaporating and curing oven 36 and a take-up reel 38.

Fly fishing lines are often manufactured on a continuous core 12. A number of bodies are applied to the core 12 resulting in a length of line consisting of a large number of fly lines, e.g., 30 or 50, connected end to end. The connections are marked so the lines can be easily cut apart into finished products. However, lengths of line consisting of 30 or 50 fly lines, each from about 70 feet to about 100 feet long, are available. Pilot lines or leaders (not shown) are attached to both ends of a long length of uncoated fly fishing line 42 which is then placed upon the payout reel 32. The payout reel is preferably a large diameter reel, e.g., 46 inches. This minimizes the set the fly line takes while cooling on the take-up reel. The uncoated line 42 is paid off the payout reel 32 and enters the coating applicator 34.

The applicator 34 and the evaporating and curing oven 36 each contain a number of sheaves. A portion of one of these sheaves 44 is shown in FIG. 4. With respect to the uncoated line 42, the sheave 44 is extremely oversized. The sheave 44 has a groove 46 around its periphery. The groove is smooth, wide and deep. The groove has a curved bottom 48 with a radius of the uncoated line 42. The groove 46 has two upwardly extending and diverging side walls 50, 52 extending from the curved bottom 48. The distance between the sidewalls is approximately two to four times the diameter of the fly fishing line to be coated. The sheave 44 is fabricated from a plastic material selected to minimize heat transfer to the line 42, minimize adherence of the coating to the sheave 44 and withstand heat. Acetal plastics, such as Delrin from DuPont, are also appropriate materials. Polytetrafluorethylene plastic, such as Teflon Brand from DuPont, is an appropriate material. The sheaves are small in diameter to minimize the residence time of the line 42 on the sheaves but have deep wide grooves 46 to assure that the line 42 does not jump out of the sheave groove.

Referring to FIG. 3, the uncoated fly line 42 passes over (in the groove of) a first intake sheave 60 and under a first coating sheave 62. The first coating sheave 62 is within a watertight container 64 with an open top. A body of coating material 66 is disposed within the container 64 and covers the first coating sheave 62. As the uncoated line 42 passes under the sheave 62, it is emersed in the coating material 66 and coated. The partially coated line 70 exits the container 64 and passes through a wiper 72. The wiper is comprised of two rollers 74, 76 substantially tangent to one another. The roller 74, 76 resemble common painting rollers. The rollers 74, 76 wipe excess coating material 66 off of the partially coated line 70. The rollers 74, 76 do not normally rotate unless a knot or other anomaly is encountered. A controlled, thin layer of coating material 66 is thereby applied to the partially coated line 70.

The line, which is moving longitudinally at a slow controlled speed, exits the applicator 34 and enters the evaporating and curing oven 36. In a preferred embodiment of the invention, the oven 36 is slightly more than 8 feet long and is kept at an air temperature of about 280°–300°. The partially coated line 70 proceeds from the wiper 72 through opening 80 to a first oven turning sheave 78 at the end of the oven opposite the wiper 72. The line 70 is wrapped around the first oven turning sheave 78 and proceeds back toward the opening 80 adjacent the applicator 34. The speed of the line 70 is set at the take-up reel 38 such that the line will travel 112 feet in 30 minutes. Therefore, the line resides in the oven 36 for about four minutes and 20 seconds after it has passed through the wiper 72. Upon exiting the oven through the opening 80, the line 70 passes under a first lower return sheave 82 and over a first upper return sheave 84. The line 70 then wraps around a second intake sheave 86. From the second intake sheave 86, the line proceeds back into the container 64 where it passes under a second coating sheave 88. A second coating of material 66 is applied to the partially coated line. The line passes through the wiper 72 and back into the oven 36 where it wraps around a second oven turning sheave 90. From the second oven turning sheave 90, the line 70 returns through the oven opening 80 and under a second lower return sheave 92 and over a second upper return sheave 94. Thus the line has been wrapped through the oven for another 16 feet of travel. Again, the line 70 resides in the oven for slightly more than four minutes. This four minute interval within the oven which is kept at a temperature between 280° and 300°, evaporates the carrier, at least partially, which forms part of the parting material 66.

From the second upper return sheave 94, the partially coated line 70 wraps around a third intake sheave 96 and proceeds into the container 64. Partially coated line 70 passes under a third coating sheave 98 and through the wiper 72. The line 70 which now has three thin coatings of coating material travels back and forth within the oven 36 fourteen times on thirteen curing sheaves 100. The line travels a total distance of about 112 feet before exiting the oven, passing over an upper exit sheave 102, a lower exit sheave 104 and being wound upon the take-up reel 38.

The curing sheave 100 are shown in FIG. 3 disposed in two vertically aligned sets at the ends of the oven 36. In the actual oven, the sheaves are arranged in two pairs of sets. A first pair of sets sheaves 106 and a second pair of sets of sheaves 108 are positioned beside one another. In the curing phase of line travel, the line proceeds back and forth down the first pair of sets of sheaves 106. The line is transferred to the second pair of sets of sheaves 108 and travels up the second set of sheaves before exiting to the upper exit sheave 102. The upper exit sheave is actually much higher than shown in FIG. 3 and the oven opening is accordingly much smaller.

The take-up reel 38 is a large diameter reel (about 46 inches in diameter). It is rotated by a motor at a constant speed of about 0.33 revolutions per minute (0.33 rpm). This provides tension which slightly stretches the line and pulls the line through the entire apparatus. The line speed is selected to provide 30 minutes of curing time in the oven 36 for the coating material 66 after the third coating is applied. The described oven is sized to provide about eight feet of travel for the line when it travels from one end of the oven to the other. A faster line speed would be used if one selected a 12-foot oven.

As previously described, all of the sheaves are considerably oversized with respect to the diameter of the line 42 or the partially coated line 70. This minimizes the contact area between the sheaves and the coated line thereby minimizing the chance of transfer of a portion of the coating to the sheaves. The sheaves 44 are small in diameter. The time over which the partially coated line 70 is in contact with the sheaves is thereby minimized. However the sheaves are kept sufficiently large so that the partially coated line is not cause to bend too tightly.

Three built-up layers of coating 22, 24 and 26 are shown in the line in FIG. 2. This is the finished line as taken up on the take-up reel 38. While the coating is created by building up layers with intermediate drying stages, a unitary coating is created because the layers are all cured together in the oven.

As can be seen in FIG. 3, the first, second and third intake sheave 60, 86, 97 are generally coaxial. The first, second and third coating sheaves 62, 88, 98 are generally coaxial. The first and second lower return sheaves 82, 92 are generally coaxial. The first and second upper return sheaves 84, 94 are generally coaxial. A compact efficient applicator 34 is thereby provided. The sheaves supporting the partially coated line 70 within the oven during coating operations, sheaves 78 and 90, are generally coaxial and horizontally offset from the curing sheaves. The two sets of curing sheaves 106 and 108 are offset from each other. A fairly narrow compact arrangement is provided. One oven structure can accommodate the sheaves associated with three applicators 34.

The oven 36 is heated by any conventional means such as electrical resistance elements, gas burners, heat lamps, or the like. An electrical resistance heating element is preferred. The element is controlled by a standard thermostat-type controller to maintain the oven at a uniform air temperature selected between 280° and 300°. It has been found that this temperature optimally cures the polytetrafluorethylene containing coating while not damaging the body of the fly fishing line.

The process described above consists of the following major elements. The fly line is placed under tension, stretching it slightly. A controlled amount of a coating material consisting of a residue and a carrier is applied to the fly line. The carrier is at least partially driven off by evaporation. A second controlled amount of coating material is applied to the fly line. The carrier in the second layer is driven off. A third layer of coating material is applied to the fly line. The carrier is driven off and the entire body of residue is cured. With the selected material, Emralon 312, and the techniques employed, a finished coating of about 0.5 mils is thereby uniformly applied to the fly line.

The following ancillary steps have also been found to be advantageous. The fly line is pretreated in what is believed to be mainly a cleaning step. Fly line is wiped with isopropyl alcohol using a lint-free applicator prior to the process described above. The currently most convenient method of performing this step is to wipe the line as it is applied to the payout reel 32. Of course the same step could be performed as the fly line 42 is taken off the payout reel 32 prior to its reaching the first intake sheave 60.

It has been found to be advantageous to periodically spray a mixture of isopropyl alcohol and water, one-half of each, onto the coating material 66 in the container 64. This appears to minimize bubble formation and results in a more uniform coating.

The evaporation of the carrier may or may not be complete in the intermediate carrier evaporation stages. However, sufficient amounts of carrier are evaporated so that a uniform subsequent layer of coating material can be applied to the partially coated line 70 without causing sags or runs.

Alternative structures for applicator 34 are available. Some such alternatives are shown in FIGS. 5–9.

In FIG. 5, the partially coated fly fishing line 70 is shown surrounded by four spray heads 110. Each spray head is fed a supply of coating material 66. The partially coated fly fishing line 70 is drawn between the spray heads at a uniform speed. The spray heads 110 spray a uniform thin stream of coating material 66 onto the partially coated fly fishing line 70. While four spray heads 110 are shown, three or even two may be used to apply an appropriate, uniform thin coating. It may be possible to apply a coating with sprayers in a sufficiently uniform thin manner that subsequent wiping is unnecessary.

In FIG. 6, a body of coating material 66 is contained in a reservoir 112. The reservoir has a bottom opening 114 which is sealed by a gasket 116. The gasket 116 is either elastomeric or felt like and has a very small hole near its center. The fly line 42 or partially coated fly line 70 is drawn upwardly through the hole in the gasket, through the coating material 66. The fly line 70 is then wiped by a wiper 72 (FIG. 3).

FIG. 7 and FIG. 8 show another structure for applying coating material 66 to the fly fishing line 42. A reservoir 120 is provided with felt pads having aligned holes. The fly fishing line 42 is drawn into the reservoir 120 through the first felt pad 122. Inside the reservoir, the fly fishing line 42 is submersed in a body of coating materials 66. The fly fishing line 42 is thereby coated with the coating material 66. The fly fishing line 42 is drawn out of the reservoir 120 through the hole in the second felt pad 124. This wipes the fly fishing line 42 resulting in a uniform thin layer of the coating material 66. FIG. 7 shows the plan view of the second felt pad 124.

In FIG. 9, the fly fishing line 42 is drawn between an upper roller 132 and a lower roller 134. The lower roller rotates with its top surface in contact with the fly fishing line 42 and its bottom surface engages a body of coating material 66 contained in a reservoir 136. As the lower roller rotates, it picks up coating material 66 for application to the fly fishing line 42. Following this first coating step, the fly fishing line turns downwardly and then in a return direction around first and second turning blocks 138, 140. What was the top 142 of the fly fishing line 42 prior to the turning blocks becomes the bottom 144 of the fly fishing line after the turning blocks 138, 140. The fly fishing line 142 is then drawn between a second upper roller 146 and a second lower roller 148. Like the first lower roller, the second lower roller 148 engages a body of coating material 66 contained in a reservoir 136. Both sides of the fly fishing line 42 are thereby coated with material which can then be wiped, if necessary, and sent through an evaporative step.

FIG. 10 illustrates an alternative structure for performing the evaporative steps and/or the curing steps performed in the oven 36 in the preferred embodiment. Rather than using convection or air current heating as is thought to occur in the oven 36, FIG. 10 illustrates the use of infrared lamps 150, 152. The infrared lamps 150, 152 emit radiation which impinges upon the partially coated fly fishing line 70 directly heating the carrier of the coating 20. In evaporative steps, the carrier is evaporated and driven off directly by the radiation induced heat. While two lamps are shown in FIG. 10, one, two, three, four, or more lamps may be used depending upon the amount of heat desired to be introduced through infra red lamp use. The infrared lamps 150, 152 can also perform the curing of the coating.

Choices of different coating material may result in the need to use slightly different processing parameters. It is contemplated that such changes will be obvious to one skilled in the art upon reading of the above-described specification. Applicant has found that application of resin bonded, preferably acrylic resin bonded, coating of polytetrafluorethylene can be permanently bonded to the body of a fly fishing line through appropriate application and the use of controlled heat over a controlled period of time. This can be done without damaging the body of the fly fishing line and is advantageously done by applying the coating in separate layers with the carrier being at least partially driven off between applications followed by a final cure step. A uniform smooth, thin, durable coating results. Obviously, a selection of the different carrier material, different carrier proportions in the overall mix, a slightly different resin bonding system or the like will result in different processing characteristics. It is intended to include such variations in the scope of the invention.

The invention has been described with reference to preferred embodiments, obviously modifications and alterations will occur to others upon the reading and understanding of this specification. It is intended to include all such modifications or alterations insofar as they come within the scope of the appended claims or the equivalents thereof.

Having thus described the invention, it is so claimed:

1. A fishing line comprising:
   a flexible core; and
   a permanent surface coating surrounding said flexible core, said surface coating comprising a halogenated hydrocarbon polymer contained in a resin which includes at least one carboxyl group, said resin cured about said flexible core to form a substantially uniform and substantially continuous non-porous layer about said flexible core, said halogenated hydrocarbon includes polytetrafluoroethylene.

2. The line as defined in claim 1, wherein said resin including polymers and/or copolymers of acrylic acid, methacrylic acid, esters of acrylic acid, esters of methacrylic acid, acrylonitrile, and mixtures thereof.

3. The line as defined in claim 2, wherein said resin is an acrylic resin.

4. The line as defined in claim 1, wherein said surface coating has a thickness up to about 0.5 mils.

5. The line as defined in claim 1, wherein said surface coating includes a plurality of layers.

6. The line as defined in claim 5, wherein said plurality of layers of said surface coating are substantially cured.

7. The line as defined in claim 6, wherein said surface coating includes three layers.

8. The line as defined in claim 1, including a body coating positioned between said flexible core and said surface coating.

9. The line as defined in claim 8, wherein said body coating has a non-uniform thickness about said flexible core.

10. The line as defined in claim 8, wherein said body coating has a composition that is different from said surface coating.

11. The line as defined in claim 10, wherein body coating includes a thermoplastic polymer.

12. The line as defined in claim 8, wherein body coating includes filler materials to vary the density of said body coating.

13. The line as defined in claim 8, wherein said body coating has a thickness greater than said surface coating.

14. The line as defined in claim 1, wherein said cured surface coating exhibits reduced bubble formation during the coating of said line with said surface coating.

15. A fishing line comprising:
a flexible core;
a body coating surrounding said flexible core; and,
a permanent surface coating surrounding said body coating, said surface coating comprising a halogenated hydrocarbon polymer contained in an acrylic resin, said acrylic resin cured onto said body coating to form a substantially uniform and substantially continuous non-porous layer on said body coating, said cured acrylic resin exhibiting reduced bubble formation during the coating of said body coating with said surface coating, said body coating has a thickness greater than said surface coating.

16. The line as defined in claim 15, wherein said halogenated hydrocarbon includes polytetrafluoroethylene.

17. The line as defined in claim 15, wherein said acrylic resin including polymers and/or co-polymers of acrylic acid, methacrylic acid, esters of acrylic acid, esters of methacrylic acid, acrylonitrile, and mixtures thereof.

18. The line as defined in claim 17, wherein said acrylic resin includes at least one carboxyl group.

19. The line as defined in claim 15, wherein said surface coating has a thickness up to about 0.5 mils.

20. The line as defined in claim 15, wherein said surface coating includes a plurality of layers.

21. The line as defined in claim 20, wherein said plurality of layers of said surface coating are substantially cured.

22. The line as defined in claim 21, wherein said plurality of layers of said surface coating are cured to form a substantially unitary coating.

23. The line as defined in claim 20, wherein said surface coating includes three layers.

24. The line as defined in claim 15, wherein said body coating has a non-uniform thickness about said flexible core.

25. The line as defined in claim 15, wherein said body coating has a composition that is different from said surface coating.

26. The line as defined in claim 25, wherein body coating includes a thermoplastic polymer.

27. The line as defined in claim 25, wherein body coating includes filler materials to vary the density of said body coating.

28. A fishing line comprising:
a flexible core;
a body coating formed about said flexible core, said body coating has a non-uniform thickness along the length of said flexible core, said body coating including a thermoplastic polymer; and
a permanent surface coating on an outer surface of said body coating, said surface coating comprising a halogenated hydrocarbon polymer contained in an acrylic resin which includes at least one carboxyl group, said acrylic resin cured on said body coating to form a substantially uniform and substantially continuous non-porous layer on said body coating, said body coating has a composition that is different from said surface coating, said body coating having a thickness greater than said surface coating.

29. The line as defined in claim 28, wherein said halogenated hydrocarbon includes polytetrafluoroethylene.

30. The line as defined in claim 28, wherein said acrylic resin including polymers and/or co-polymers of acrylic acid, methacrylic acid, esters of acrylic acid, esters of methacrylic acid, acrylonitrile, and mixtures thereof.

31. The line as defined in claim 28, wherein said surface coating has a thickness up to about 0.5 mils.

32. The line as defined in claim 28, wherein said surface coating includes a plurality of layers.

33. The line as defined in claim 32, wherein said plurality of layers of said surface coating are substantially cured.

34. The line as defined in claim 32, wherein said surface coating includes three layers.

35. The line as defined in claim 28, wherein body coating includes filler materials to vary the density of said body coating.

36. The line as defined in claim 28, wherein said cured surface coating exhibits reduced bubble formation during the coating of said body coating with said surface coating.

37. A fishing line comprising:
a flexible core;
a permanent surface coating surrounding said flexible core, said surface coating comprising a halogenated hydrocarbon polymer contained in a resin, said resin cured about said flexible core to form a substantially uniform and substantially continuous non-porous layer about said flexible core, said surface coating including a plurality of coating layers; and,
a body coating positioned between said flexible core and said surface coating, said body coating having a thickness greater than said surface coating.

38. A fishing line comprising:
a flexible core; and
a permanent surface coating surrounding said flexible core, said surface coating comprising a halogenated hydrocarbon polymer contained in a resin, said resin cured about said flexible core to form a substantially uniform and substantially continuous non-porous layer about said flexible core, said surface coating including a plurality of coating layers, said resin includes a resin substrate which includes at least one carboxyl group, said resin substrate including polymers and/or co-polymers of acrylic acid, methacrylic acid, esters of acrylic acid, esters of methacrylic acid, acrylonitrile, and mixtures thereof, and wherein said halogenated hydrocarbon includes polytetrafluoroethylene.

39. The line as defined in claim 38, wherein said resin is an acrylic resin.

40. The line as defined in claim 38, wherein said surface coating has a thickness up to about 0.5 mils.

41. The line as defined in claim 38, wherein said surface coating includes three layers.

42. The line as defined in claim 38, including a body coating positioned between said flexible core and said surface coating.

43. The line as defined in claim 42, wherein said body coating has a non-uniform thickness about said flexible core along the length of the line.

44. The line as defined in claim 42, wherein said body coating has a composition that is different from said surface coating.

45. The line as defined in claim 44, wherein body coating includes a thermoplastic polymer.

46. The line as defined in claim 42, wherein body coating includes filler materials to vary the density of said body coating.

47. The line as defined in claim 38, wherein said cured surface coating exhibits reduced bubble formation during the coating of said line with said surface coating.

* * * * *